(12) United States Patent
Mori et al.

(10) Patent No.: US 10,609,804 B2
(45) Date of Patent: Mar. 31, 2020

(54) LASER DRIVEN LAMP

(71) Applicant: USHIO DENKI KABUSHIKI KAISHA, Tokyo (JP)

(72) Inventors: Kazuyuki Mori, Tokyo (JP); Junya Asayama, Tokyo (JP)

(73) Assignee: USHIO DENKI KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/050,174

(22) Filed: Jul. 31, 2018

(65) Prior Publication Data
US 2019/0045615 A1 Feb. 7, 2019

(30) Foreign Application Priority Data
Aug. 2, 2017 (JP) ................. 2017-149617

(51) Int. Cl.
| | | |
|---|---|---|
| H05G 2/00 | (2006.01) | |
| G21K 1/06 | (2006.01) | |
| G02B 5/10 | (2006.01) | |
| G02B 5/08 | (2006.01) | |
| H01J 61/00 | (2006.01) | |
| G02B 19/00 | (2006.01) | |

(52) U.S. Cl.
CPC .......... *H05G 2/008* (2013.01); *G02B 5/0891* (2013.01); *G02B 5/10* (2013.01); *G02B 19/0023* (2013.01); *G21K 1/06* (2013.01); *H01J 61/00* (2013.01)

(58) Field of Classification Search
CPC ..... G03F 7/70016; H01J 61/025; H01J 65/04; G21K 5/00; H05H 1/24; H05G 2/008
See application file for complete search history.

(56) References Cited

U.S. PATENT DOCUMENTS

| | | | | |
|---|---|---|---|---|
| 5,818,169 A | * | 10/1998 | Morimoto | G03F 7/70016 313/631 |
| 6,265,813 B1 | * | 7/2001 | Knox | H01J 61/36 313/113 |
| 6,972,421 B2 | * | 12/2005 | Melnychuk | B82Y 10/00 250/493.1 |
| 8,182,127 B2 | * | 5/2012 | Yasuda | G03F 7/70016 250/493.1 |
| 8,651,701 B2 | | 2/2014 | Yasuda et al. | |
| 9,390,902 B2 | * | 7/2016 | Bezel | H01J 65/00 |

(Continued)

FOREIGN PATENT DOCUMENTS

JP 2010-170112 A 8/2010

*Primary Examiner* — Wyatt A Stoffa
(74) *Attorney, Agent, or Firm* — Studebaker & Brackett PC

(57) ABSTRACT

A laser driven lamp includes a metallic main body having a columnar shape. The lamp also includes an ellipsoidal reflecting surface formed in the main body such that the ellipsoidal reflecting surface has a focal point at which the laser beam converges. The lamp also includes a light exit window in front of the ellipsoidal reflecting surface. The light exit window transmits ultraviolet light. The lamp also includes a laser beam passing hole formed at a predetermined position of the main body such that this hole penetrates the main body in an optical axial direction of the lamp. The lamp also includes a light entrance window behind the laser light passing hole such that the laser beam is incident to the light entrance window. The main body, the light exit window and the light entrance window form a closed space to contain a light emitting gas.

11 Claims, 7 Drawing Sheets

(56) References Cited

U.S. PATENT DOCUMENTS

| | | | | |
|---|---|---|---|---|
| 2005/0206319 A1* | 9/2005 | Botzer | ............... | H01J 61/025 |
| | | | | 313/634 |
| 2007/0228288 A1* | 10/2007 | Smith | ............... | B82Y 10/00 |
| | | | | 250/426 |
| 2007/0228300 A1* | 10/2007 | Smith | ............... | B82Y 10/00 |
| | | | | 250/504 R |
| 2009/0032740 A1* | 2/2009 | Smith | ............... | B82Y 10/00 |
| | | | | 250/503.1 |
| 2010/0264820 A1* | 10/2010 | Sumitomo | ............... | H01J 61/025 |
| | | | | 313/639 |
| 2011/0085337 A1* | 4/2011 | Yokota | ............... | H01J 61/025 |
| | | | | 362/259 |
| 2011/0181191 A1* | 7/2011 | Smith | ............... | B82Y 10/00 |
| | | | | 315/149 |
| 2011/0291566 A1* | 12/2011 | Bezel | ............... | G21B 1/23 |
| | | | | 315/111.21 |
| 2013/0215618 A1* | 8/2013 | Matsuura | ............... | H01J 61/025 |
| | | | | 362/264 |
| 2015/0048741 A1* | 2/2015 | Shortt | ............... | G21K 5/00 |
| | | | | 315/111.41 |
| 2016/0086788 A1* | 3/2016 | Blondia | ............... | H01J 61/025 |
| 2016/0233079 A1* | 8/2016 | Asai | ............... | H01J 65/04 |
| 2017/0135192 A1* | 5/2017 | Blondia | ............... | H05H 1/46 |
| 2017/0263433 A1* | 9/2017 | Blondia | ............... | H01J 61/025 |
| 2018/0012750 A1* | 1/2018 | Asai | ............... | H01J 65/04 |
| 2019/0108994 A1* | 4/2019 | Blondia | ............... | H01J 61/025 |

* cited by examiner

LASER DRIVEN LAMP

FIELD OF THE INVENTION

The present invention relates to a laser driven lamp and a laser driven light source device. More specifically, the present invention relates to a laser driven lamp that has a module, in which a lamp main body and a reflection mirror are integrated, and a laser driven light source device that has such module.

DESCRIPTION OF THE RELATED ART

In recent years, an ultraviolet light source that receives a large amount of input electric power is used in a method of manufacturing processed products such as semiconductors, liquid crystal substrates, color filters and the like.

In such a manufacturing method, there is a demand for reduction in the processing time. To meet the demand, a light source uses a laser to introduce an energy into a discharge space such that a light emitting gas is excited to obtain ultraviolet radiation. One example of such technique is disclosed in Japanese Patent Application Laid-Open Publication No. 2010-170112.

The light source of Japanese Patent Application Laid-Open Publication No. 2010-170112 is often called an LPP (Laser Produced Plasma) light source, or an LSP (Laser Sustained Plasma) light source.

The technique disclosed in Japanese Patent Application Laid-Open Publication No. 2010-170112 is schematically illustrated in FIG. 7 of the accompanying drawings. As shown in FIG. 7, a plasma generating vessel 30 includes a light emitting part 31 and a sealing part 32. The light emitting part 31 is made from quartz glass. In the light emitting part 31, contained and sealed is a light emitting substance such as mercury and xenon.

In the light source shown in FIG. 7, the plasma generating vessel 30 is a no-electrode plasma generating vessel. The plasma generating vessel 30 is disposed at one of focal points F1 of an ellipsoidal reflector (reflecting mirror) 40. A laser beam generator 50 is disposed outside the ellipsoidal reflector 40, and the laser beam such as a pulsed laser beam or a CW (Continuous Wave) laser beam is introduced into the plasma generating vessel 30 from the laser beam generator 50.

The laser beam emitted from the laser beam generator 50 proceeds through a window 61 of a plane mirror 60, and condensed by a condensing lens 70 disposed between the window 61 and the plasma generating vessel 30 such that the plasma vessel 30 is irradiated with the condensed beam. Because the laser beam is condensed, it is possible to increase the energy density at the focal point F1, excite the light emitting substance, and generate the radiation (light). The resulting light (radiated light) is reflected by the ellipsoidal reflector 40 and the plane mirror 60, and proceeds toward an object to be irradiated (target substance).

SUMMARY OF THE INVENTION

In the above-described conventional LPP lamp, the quartz glass is used as the material of the plasma vessel. The plasma vessel receives high-output ultraviolet light (UV light) and high-output vacuum ultraviolet light (VUV light) from the plasma. Thus, the plasma vessel tends to have distortion, which is caused by the ultraviolet light and the vacuum ultraviolet light.

As the distortion caused by the ultraviolet light and the vacuum ultraviolet light accumulates, cracks are eventually generated in the glass surface. The cracks can become the origin of breakage of the lamp.

In order to avoid this, i.e., to reduce the distortion caused by the ultraviolet light and the vacuum ultraviolet light, the plasma generating vessel may be made from a rock crystal (crystallized quartz), sapphire or other crystalline material. From the view point of the manufacturing technique, however, it is extremely difficult to form a cylindrical vessel and a spherical vessel from the crystalline material. Because of the difficulty in the manufacturing process, therefore, use of the crystalline material is not practical.

An object of the present invention is to provide a laser driven lamp in which cracking, which would otherwise be caused by ultraviolet light and vacuum ultraviolet light from plasma, does not take place in a plasma vessel even if the lamp is irradiated with high-output ultraviolet light and vacuum ultraviolet light from the plasma. Such laser driven lamp allows the plasma vessel to receive an increased amount of input energy, and therefore can yield large-output ultraviolet light and vacuum ultraviolet light.

According to one aspect of the present invention, there is provided a laser-driven lamp configured to receive a converging laser beam and generate plasma from the laser beam. The laser driven lamp includes a main body made from a metal and having a columnar shape, and a light emitting gas contained and sealed in the main body. The laser driven lamp also includes an ellipsoidal reflecting surface formed in the main body such that the ellipsoidal reflecting surface has a first focal point at which the laser beam converges (condenses). The laser driven lamp also includes a light exit window provided in front of the ellipsoidal reflecting surface. The light exit window is configured to transmit ultraviolet light. The laser driven lamp also includes a laser beam passing hole formed at a predetermined position of the main body such that the laser beam passing hole penetrates the main body in an optical axial direction of the lamp. The laser driven lamp also includes a light entrance window provided behind the laser light passing hole such that the laser beam is incident to the light entrance window, i.e., such that the laser beam enters the main body from the light entrance window. The main body, the light exit window and the light entrance window form in combination a closed space to contain the light emitting gas.

The main body may have a base portion in which the ellipsoidal reflecting surface is formed, and a front portion jointed to a front end of the base portion. The front portion may have a cylindrical inner surface therein such that the cylindrical inner surface has a decreasing diameter toward a front end of the front portion. The light exit window may be provided at the front end of the front portion or in the front end face of the front portion.

The laser driven lamp may further include at least one air release pipe at the front portion. The air release pipe(s) may communicate with the closed space in the main body.

The base portion may have a cylindrical part, and a reflecting part received in the cylindrical part. The reflecting part may be made from a metallic material that is different from a material of the cylindrical part. The elliptical reflecting surface may be formed on the reflecting part. The reflecting part may have an outer surface and an inner surface, and the inner surface may define the elliptical reflecting surface.

The laser driven lamp may further include a convection controlling member in the closed space. The convection controlling member may be located at a predetermined position or directed in a predetermined direction such that the convection controlling member faces the plasma that will be generated in the vicinity of the first focal point of the ellipsoidal reflecting surface. The laser driven lamp may further include a supporting structure for supporting the convection controlling member in the closed space. The supporting structure may have a ring-shaped support disposed below the light exit window, and a rod that extends downward from the ring-shaped support. The convection controlling member may be attached to a lower end of the rod.

The main body may be made from tungsten or a tungsten alloy.

According to a second aspect of the present invention, there is provided another laser driven lamp configured to receive a converging laser beam and generate plasma from the laser beam. The laser driven lamp includes a main body made from a metal and having a columnar shape, and a light emitting gas contained and sealed in the main body. The laser driven lamp also includes an ellipsoidal reflecting surface formed in the main body such that the ellipsoidal reflecting surface has a first focal point at which the laser beam converges. The laser driven lamp also includes a light entrance-and-exit window provided in front of the ellipsoidal reflecting surface. The light entrance-and-exit window is configured to transmit the laser beam and ultraviolet light. The main body and the light entrance-and-exit window form in combination a closed space to contain the light emitting gas.

According to a third aspect of the present invention, there is provided a laser driven light source device that includes the laser driven lamp according to the second aspect of the present invention. The laser driven light source device also includes a dichroic mirror disposed in front of the light entrance-and-exit window such that the converging laser beam enters the main body through the dichroic mirror. The dichroic mirror is configured to reflect the laser beam and transmit the ultraviolet light or to transmit the laser beam and reflect the ultraviolet light.

The laser driven lamp of the present invention includes the metallic main body having a columnar shape or a post shape. Thus, even if the laser driven lamp is subjected to high-output ultraviolet light and vacuum ultraviolet light from the plasma, the lamp does not suffer from distortions that would otherwise be produced by the ultraviolet light and/or the vacuum ultraviolet light. Accordingly, the laser driven lamp can have a long service life and generate a high output.

Because the ellipsoidal reflecting surface is formed on the inner surface of the main body of the lamp, the ultraviolet light and the vacuum ultraviolet light from the plasma arrive at the light exit window while they are being converged. Thus, the light exit window can have a smaller diameter than the diameter of the opening of the ellipsoidal reflecting surface. The light exit window can have a smaller diameter than the diameter of the upper end opening of the base portion. This structure enhances the pressure resistance of the light exit window, and reduces the possibility of breakage of the light exit window.

Tungsten and a tungsten alloy have a high stress resistance (high strength). When the lamp main body is made from tungsten or the tungsten alloy, the strength of the laser driven lamp increases significantly. Accordingly, the laser driven lamp can receive a high-output laser beam.

When the lamp main body has a sole window, which serves as the light entrance-and-exit window, the structure of the laser driven lamp becomes simpler. This further enhances the stress resistance of the lamp.

DETAILED DESCRIPTION OF THE INVENTION

Embodiments of the present invention will now be described in detail below.

Figure 1:
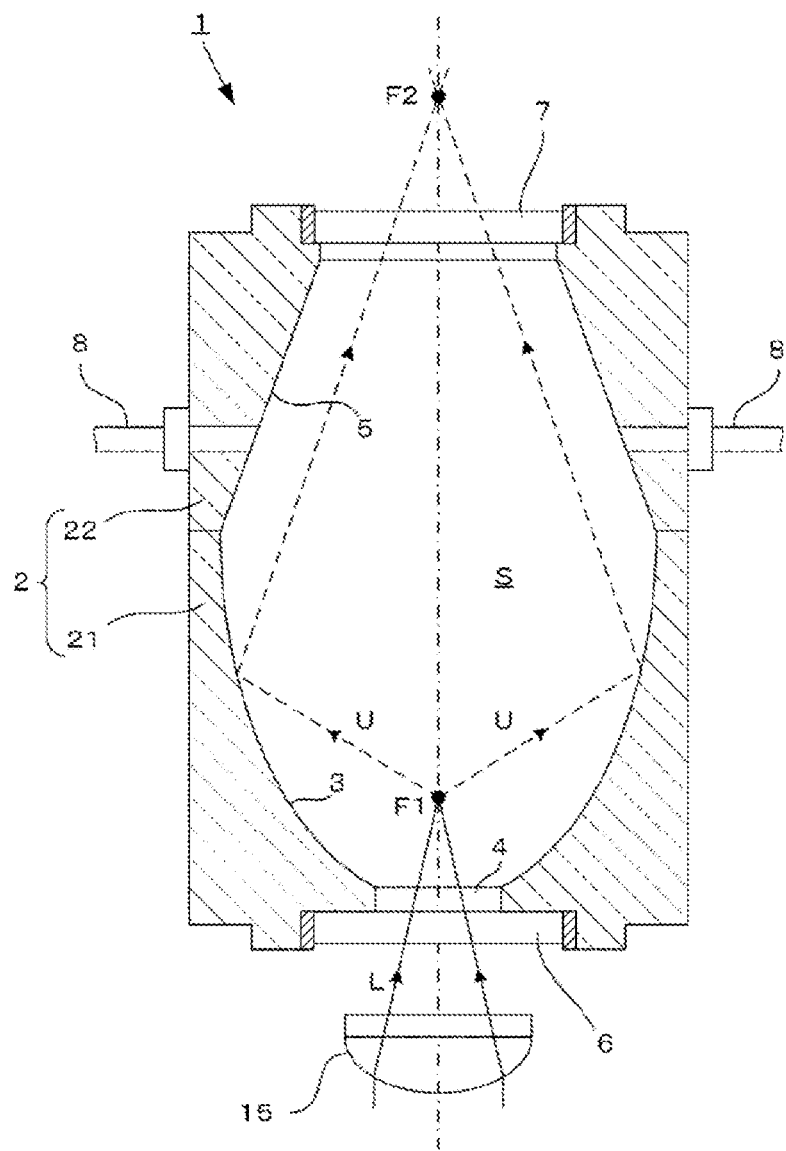
FIG. 1 is a cross-sectional view of a lamp according to a first embodiment of the present invention.

Referring to FIG. 1, which illustrate a first embodiment of the present invention, a laser driven lamp 1 includes a cylindrical main body 2. The main body 2 is made from metal such as tungsten, molybdenum, copper or aluminum. Among these metallic materials, tungsten has a particularly high melting point, exhibits a sufficient mechanical strength even at high temperature, and possesses a high thermal conductivity. Thus, tungsten is a preferred material.

It should be noted that the material of the main body 2 may be tungsten alloy or tungsten heavy alloy that contains copper, nickel or iron.

The main body 2 has a base portion (lower portion) 21 and a front portion (upper portion) 22, which is joined to a front end of the base portion 21 by brazing or welding. The base portion 21 has an ellipsoidal reflector (surface) 3 therein. Specifically, the base portion 21 has an outer surface and an inner surface, and the inner surface defines the ellipsoidal reflecting surface 3.

The base portion 21 also has a laser beam passing hole 4 that penetrates the base portion 21 in the optical axis direction of the ellipsoidal reflecting surface 3, i.e., in the axis direction of the lamp main body 2. Behind (or below) the laser beam passing hole 4, disposed is a light incident window 6. The laser beam enters the lamp main body from the light incident window 6. The light incident window 6 is disposed on the laser beam incident side.

The light incident window 6 is transparent to the laser beam, i.e., the laser beam can pass through the window 6. The light incident window 6 may be made from crystal (crystallized quartz), sapphire, quartz, magnesium fluoride (MgF2) or the like.

The front portion 22 has a cylindrical shape. The front portion 22 has an outer surface and an inner surface 5. The inner cylindrical surface 5 of the front portion 22 has a decreasing diameter toward its front end. At the front end (upper end) of the front portion 22, formed is a light exit window 7. The light exit window 7 is transparent to the ultraviolet light. Similar to the light incident window 6, the light exit window 7 may be made from crystal (crystallized quartz), sapphire, quartz, magnesium fluoride (MgF2) or the like.

The main body 2, the light entrance window 6 and the light exit window 7 constitute, in combination, closed space S. In the closed space S, contained and sealed is a light emitting gas. The light emitting gas may be a rare gas such as a xenon gas, a krypton gas and an argon gas, or a mercury gas, depending upon a wavelength of the light to be emitted.

Air release pipes (exhaust pipes) 8 are attached to the side surface of the front portion 22 of the main body 2 such that the air release pipes 8 communicate with the closed space S. If the air release pipes 8 were attached to the base portion 21 of the main body 21, the air release pipes 8 may adversely affect the optical characteristics of the ellipsoidal reflecting surface 3. In this embodiment, however, the air release or exhaust pipes 8 are attached to the upper portion 22 to avoid such inconvenience.

Preferably, two air release pipes 8 are attached to the main body 2, as shown in FIG. 1. When the front portion (upper portion) 22 is welded to the base portion (lower portion) 21 of the main body 2, an inert gas is introduced into the interior of the main body 2 from one of the two air release pipes 8 and expelled to the outside from the other pipe 8 in order to avoid the oxidization of the ellipsoidal reflecting surface 3.

After the main body 2 is assembled, an end of one of the two air release pipes (e.g., right pipe) 8 is closed by pressure welding, and cut. Then, the gas in the space S is expelled to the outside from the other pipe (e.g., left pipe) 8. Subsequently, the light emitting gas is introduced into the space S from the left pipe 8. Finally, an end of the left pipe 8 is also closed by pressure welding, and cut in order to complete the sealing of the closed space S.

In FIG. 1, the laser beam L from a laser source (not shown) is converged through the light condensing lens (converging lens) 15, and enters the closed space S of the laser driven lamp 1 through the light entrance window 6. The laser beam L is converged to the first focal point F1 of the ellipsoidal reflecting surface 3 in the closed space S, which is filled with the light emitting gas, to generate plasma.

The ultraviolet light U, which is excitation light produced by the plasma, is guided to the outside from the light exit window 7 disposed at the front face of the lamp 1 while it is being converged by the ellipsoidal reflecting surface 3. The ultraviolet light U is then converged at the second focal point F2.

The front portion 22 of the lamp main body 2 has the inner cylindrical surface 5 whose diameter gradually decreases. Since the ultraviolet light U proceeds while it is being converged, the ultraviolet light U does not impinge upon the cylindrical inner surface 5. Because of such configuration of the inner cylindrical surface 5 of the front portion 22, the outer diameter of the light exit window 7 can be smaller than the front end opening (upper end opening) of the concave reflecting surface 3. This enhances the strength of the main body 2 against the inner pressure.

It should be noted that although the second focal point F2 of the ellipsoidal reflecting surface 3 is present outside the laser driven lamp 1 in the illustrated embodiment, the second focal point F2 may be present inside the closed space S.

Figure 2A:
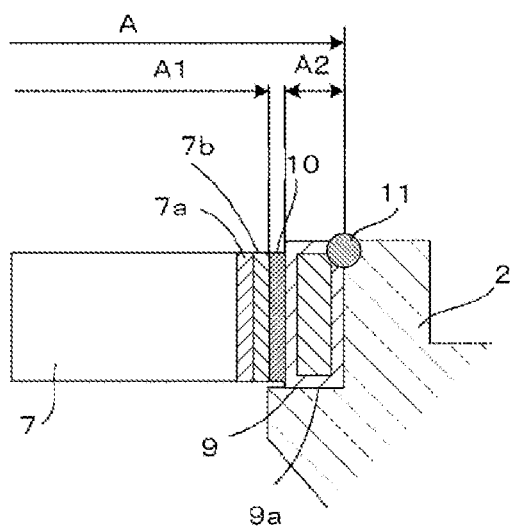
FIG. 2A is a cross-sectional view of a structure for mounting a light exit window on a main body of the lamp.
Figure 2B:
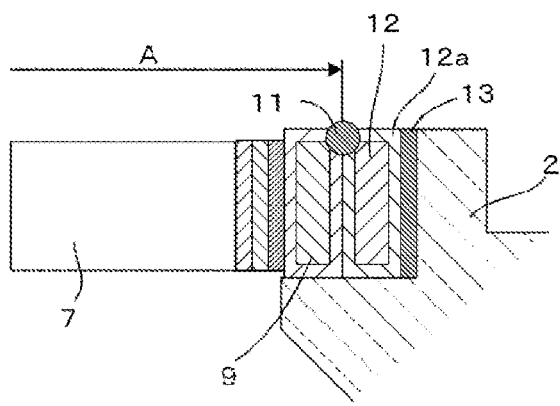
FIG. 2B is a cross-sectional view of another structure for mounting the light exit window on the main body of the lamp.

FIGS. 2A and 2B illustrate different examples of a structure for mounting the light entrance window 6 and the light exit window 7 on the main body 2. It should be noted that FIGS. 2A and 2B show only the mounting structure for the light exit window 7, but the same mounting structure may be used for the light entrance window 6.

Referring to FIG. 2A, the circumference surface of the light exit window 7, which is made from crystal, sapphire or the like, is coated with, for example, a metallized layer 7a. The metallized layer 7a is obtained by applying a metallizing process with metal that contains a mixture of molybdenum and manganese (Mo—Mn). A nickel plating 7b is applied on the metallized layer 7a, and this yields a first window unit A1.

In the meantime, a nickel plating 9a is applied on a ring member 9 to obtain another window unit A2. The ring member 9 is made from kovar. The second window unit A2 is joined to the first window unit A1 by Ag brazing 10 to obtain an assembled window unit A.

Then, the kovar ring member 9, which has the nickel plating 9a thereon, of the resulting window unit A is joined to the metal of the main body 2 by welding 11 such as the TIG welding or laser welding.

FIG. 2B shows another example of the mounting structure. If the main body 2 is made from tungsten, there is a considerable difference in the melting point between tungsten and kovar (first ring member 9). Thus, it is difficult to directly weld the first ring member 9 to the main body 2. In such case, a second ring member 12, which is made from kovar, is disposed in the vicinity of the main body 2. Then, the second ring member 12 is welded to the first ring member 9, which is made from kovar, disposed in the vicinity of the light exit window 7.

Specifically, the nickel plating 12a is applied on the second ring member 12, which is made from kovar, and the combination of the second ring member 12 and the nickel plating 12a is joined to the main body 2 by Cu brazing 13. The Cu brazing 13 is used as the brazing material in this embodiment because the appropriate contact between the tungsten of the main body 2 and the brazing material is considered.

Subsequently, the kovar ring member 9 of the window unit A of the light exit window 7 is welded to the second kovar ring member 12 joined to the main body 2 by welding 11.

One numerical example of the first embodiment is shown below.

Main body: Tungsten, Total length is 162 mm, Outer diameter is 90 mm.

Filler gas: Ar gas, 5.0 MPa (25 degrees C.)

Light entrance window: Sapphire, Outer diameter is 50.8 mm, Thickness is 15 mm

Light exit window: Sapphire, Outer diameter is 50.8 mm, Thickness is 15 mm

Ring member: Kovar

Air release pipe: Nickel, Outer diameter is 3 mm

Figure 3:
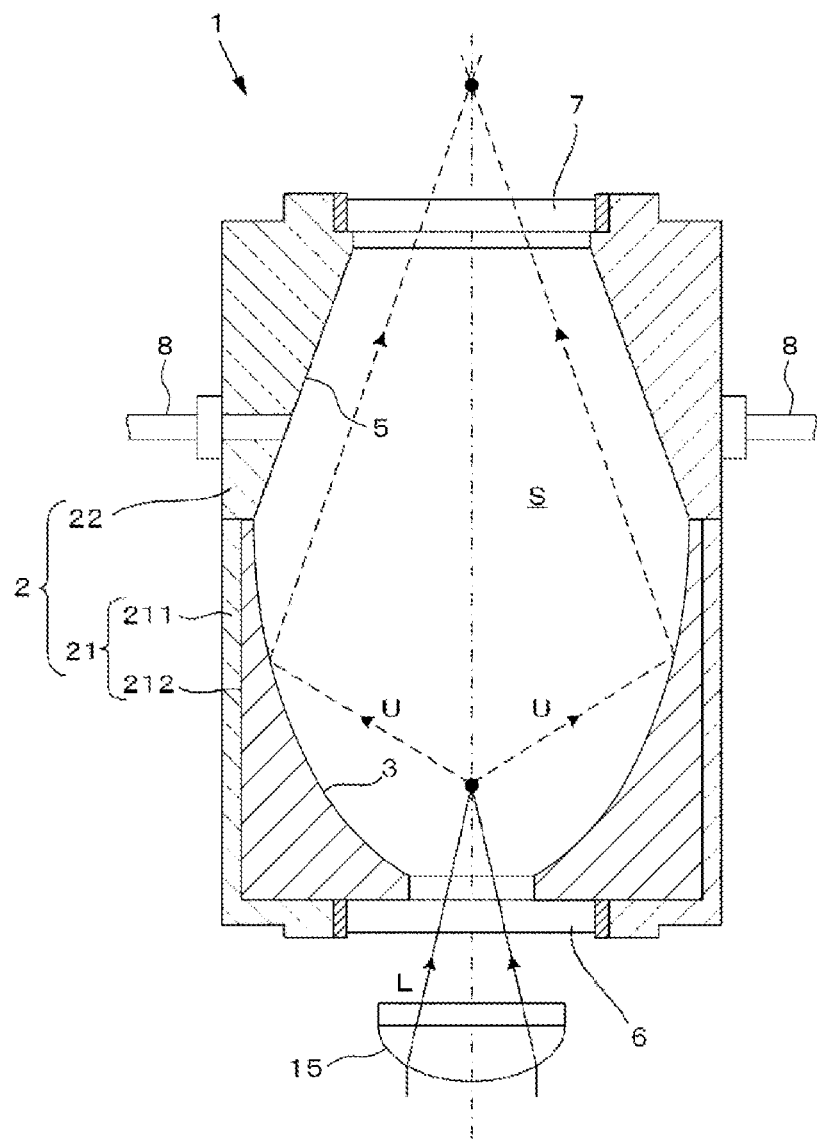
FIG. 3 is a cross-sectional view of a lamp according to a second embodiment of the present invention.

FIG. 3 shows a second embodiment of the present invention. The following passages will primarily describe the differences between the first embodiment and the second embodiment. Similar components are designated by similar reference numerals in the first and second embodiments, and the redundant description for such components will be omitted.

When the main body 2 is made from a metal having a high melting point (e.g., tungsten or molybdenum), such metal is difficult to cut or machine. Thus, cutting or machining the ellipsoidal reflecting surface 3 to a mirror surface may be difficult. In consideration of this fact, that portion of the main body 2 which will become the mirror surface may be made from a material that is easy to cut or machine. In FIG. 3, the base portion 21 of the main body 2 has a cylindrical part 211 and a reflecting part 212. The reflecting part 212 is made from a material that is different from a material of the cylindrical part 211. For example, the reflecting part 212 is made from a metal material such as aluminum, which is easy to cut and machine. On the inner (exposed) surface of the reflecting part 212, formed is the ellipsoidal reflecting surface 3. As such, the process for the mirror finish is easily applied to the reflecting part 212 (or the ellipsoidal reflecting surface 3).

The reflecting part 212 is received and fixed in the cylindrical part 211 by means of press fit, welding or the like. The reflecting part 212 may be subjected to high temperature that is caused by the plasma, but the cylindrical part 211 that is made from a metal having good heat conduction can release the heat in an efficient manner.

Figure 4:
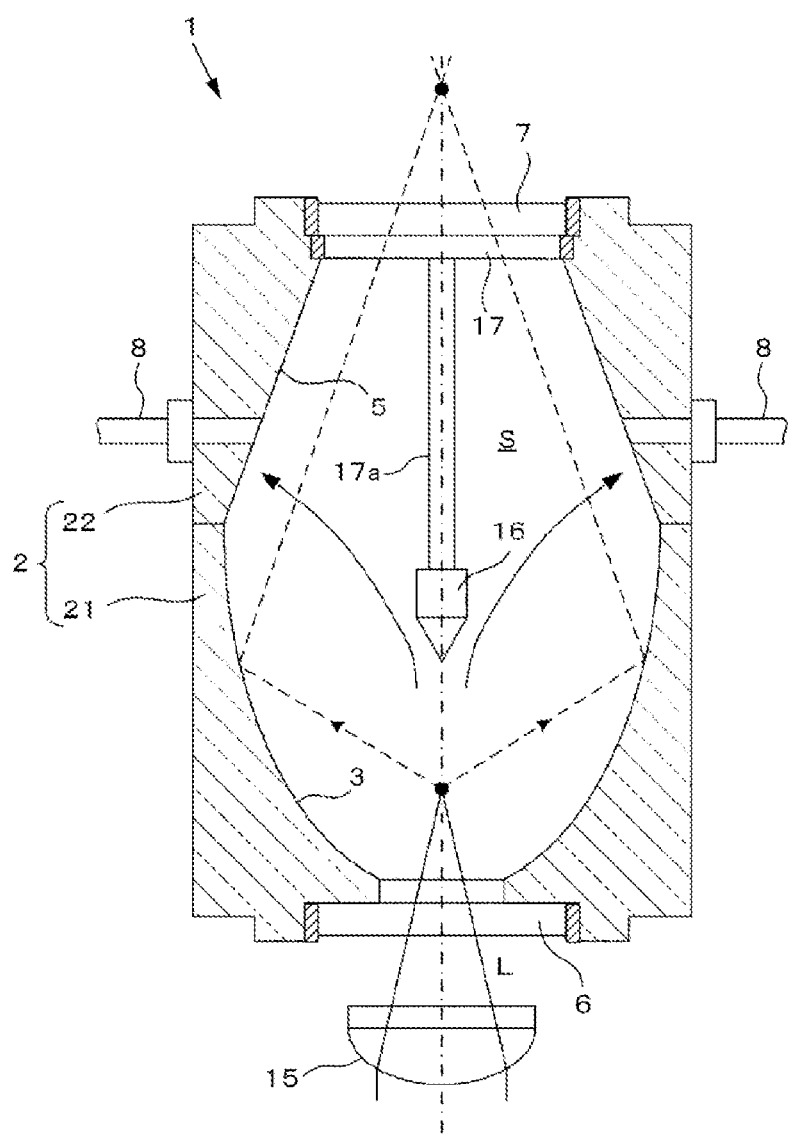
FIG. 4 is a cross-sectional view of a lamp according to a third embodiment of the present invention.
Figure 5:
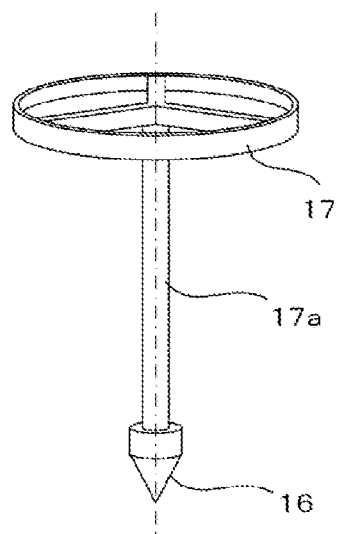
FIG. 5 is a perspective view of a convection controlling member in the third embodiment.

FIGS. 4 and 5 show a third embodiment of the present invention. The following passages will primarily describe the differences between the first embodiment and the third embodiment. Similar components are designated by similar reference numerals in the first and third embodiments, and the redundant description for such components will be omitted.

The lamps of the embodiments shown in FIGS. 1 to 3 may be used for vertical lighting and horizontal lighting. The lamp shown in FIG. 4 is only used for vertical lighting.

In the closed space S of the main body 2, the light emitting gas circulates by convection as the light emitting gas is heated by the plasma. Thus, the plasma generating position may fluctuate, and an amount of light emission may vary. In order to avoid or reduce this, the third embodiment provides a convection controlling (or convection restricting) member 16 in the closed space S.

The lower end of the convection controlling member 16 has a conical shape. The convection controlling member 16 is disposed such that the member 16 faces the plasma that will be generated in the vicinity of the first focal point F1 of the ellipsoidal reflecting surface 3.

As illustrated in FIG. 5, the convection controlling member 16 is supported by a supporting structure. The supporting structure has a ring-shaped support 17 that is disposed below the light exit window 7 of the lamp main body 2, and a rod 17a that extends downward from the ring-shaped support 17. The convection controlling member 16 is attached to the lower end of the rod 17a. The ring-shaped support 17 is supported by the upper portion 22 of the main body 2.

Having such configuration, the convection controlling member 16 can rectify the upward flow of the light emitting gas as the light emitting as is heated by the plasma. Therefore, it is possible to reduce or avoid the fluctuations of the plasma.

It should be noted that similar to the second embodiment shown in FIG. 3, the base portion 21 of the main body 2 of this embodiment may have a cylindrical part 211 and a reflecting part 212. The reflecting part 212 is made from a material that is different from a material of the cylindrical part 211.

Although the laser beam enters the main body 2 from the light entrance window 6, which is provided at one end of the main body 2, and the ultraviolet light exits the main body 2 from the light exit window 7, which is provided at the other end of the main body 2, in the embodiments shown in FIGS. 1 to 4, the present invention is not limited to such configuration. For example, the laser beam may enter the main body 2 of the lamp 1 from a particular window, and the ultraviolet light may exit the main body 2 from the same window. This modification will be described below as a fourth embodiment of the present invention.

Figure 6:
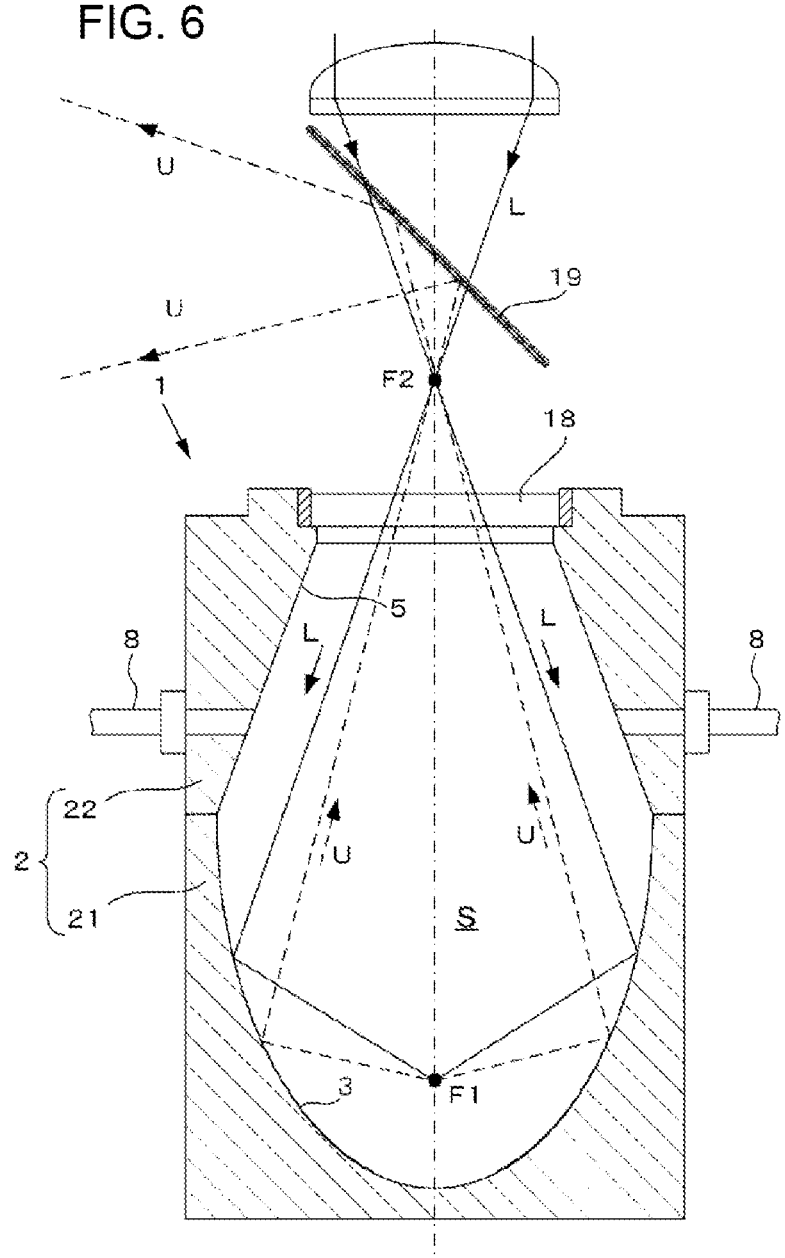
FIG. 6 is a cross-sectional view of a lamp according to a fourth embodiment of the present invention.
Figure 7:
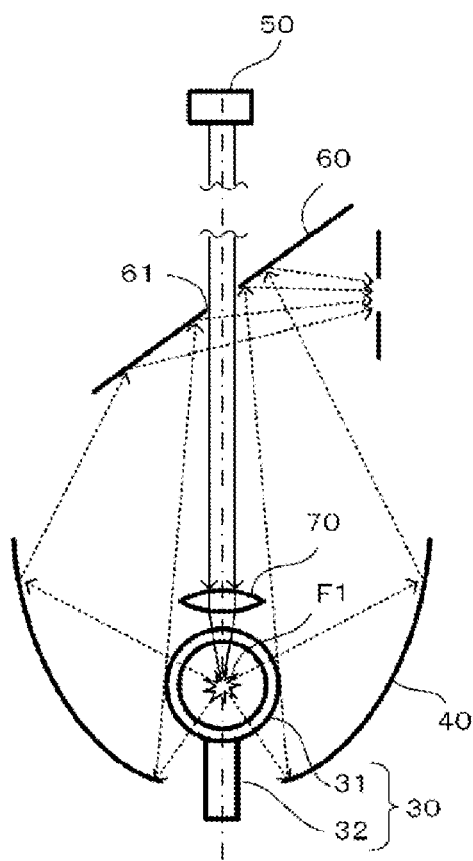
FIG. 7 schematically illustrates a conventional arrangement.

FIG. 6 illustrates the fourth embodiment of the present invention. The following passages will primarily describe the differences between the first embodiment and the fourth embodiment. Similar components are designated by similar reference numerals in the first and fourth embodiments, and the redundant description for such components will be omitted.

As shown in FIG. 6, only one of the two ends (upper end) of the metallic main body 2 of the lamp 1 has an opening. In this opening, a light entrance-and-exit window 18 is disposed. The light entrance-and-exit window 18 is configured to transmit the laser beam and ultraviolet light.

Thus, unlike the first to third embodiments, the main body 2 of the lamp 1 of this embodiment does not have the laser light passing opening 4. In the fourth embodiment, the closed space S is defined by the main body 2 and the light entrance-and-exit window 18.

A laser driven light source device can use the laser driven lamp 1 of the fourth embodiment. In such light source device, a dichroic mirror 19 is disposed in front of (or above) the light entrance-and-exit window 18 such that the dichroic mirror 19 faces the window 18. The dichroic mirror 19 transmits the laser beam L and reflects the ultraviolet light U.

The laser beam is emitted from a laser source (not shown) and the converging laser beam L passes through the dichroic mirror 19. Then, the laser beam L converges at the second focal point F2 of the ellipsoidal reflecting surface 3 and further proceeds. The laser beam L enters the closed space S in the lamp main body 2 through the light entrance/exit window 18. The laser beam L is reflected by the ellipsoidal reflecting surface 3 and converges at the first focal point F1.

The plasma is generated here, and the ultraviolet light U is generated from the plasma. The ultraviolet light U is reflected by the ellipsoidal reflecting surface 3, and exits from the light entrance-and-exit window 18 while it is converging. Then, the ultraviolet light U is reflected by the dichroic mirror 19, and will be utilized for an intended purpose.

With the above-described configuration, the main body 2 of the lamp 1 of this embodiment only needs to have a sole opening for the light (i.e., light entrance/exit window) 18. This simplifies the structure of the lamp main body 2, and further improves (enhances) the pressure resistance and the heat resistance of the lamp main body 2.

It should be noted that the dichroic mirror 19 may reflect the laser beam L and transmit the ultraviolet light U. In such case, the laser source may be disposed on the left side in FIG. 6 such that the laser beam from the laser source proceeds to the right and is reflected by the dichroic mirror 19, and the ultraviolet light U passes upward through the dichroic mirror 19.

It should be noted that similar to the second embodiment shown in FIG. 3, the base portion 21 of the main body 2 of this embodiment may have a cylindrical part 211 and a reflecting part 212. The reflecting part 212 is made from a material that is different from a material of the cylindrical part 211. It should also be noted that similar to the third embodiment shown in FIGS. 4 and 5, a convection controlling (or convection restricting) member 16 may be provided in the closed space S. The convection controlling member 16 may be disposed such that the member 16 faces the plasma that will be generated in the vicinity of the first focal point F1 of the ellipsoidal reflecting surface 3.

As described above, the laser driven lamp 1 includes the metallic main body 2 that has a columnar shape. Also, the ellipsoidal reflecting surface 3 is formed inside the main body 2 of the lamp 1. The light exit window 7, which transmits the ultraviolet light, is provided at the front face of the lamp 1. The laser light passing hole 4, which penetrates the main body 2 in the optical axis direction, is provided at the center of the bottom face of the main body 2. Behind the laser light passing hole 4, provided is the light entrance window 6 such that the laser beam is incident to the light entrance window 6. Accordingly, the pressure resistance and the heat resistance of the main body 2 of the lamp 1 are improved. Thus, the lamp 1 can appropriately receive and handle the high-input laser beam. As a result, the lamp 1 can yield the high-output ultraviolet light and vacuum ultraviolet light.

Since the lamp 1 employs the ellipsoidal reflecting surface 3, the hollow space S in the lamp main body 2 can have a decreasing diameter toward the ultraviolet light exit 7 of the lamp main body 2. The light exit window 7 can have a small outer diameter. This enhances the pressure resistance of the window portion of the lamp 1.

This application is based on Japanese Patent Application No. 2017-149617 filed on Aug. 2, 2017, and the entire disclosure thereof is incorporated herein by reference.

What is claimed is:

1. A laser driven lamp configured to receive a converging laser beam and generate plasma from the laser beam, the laser driven lamp comprising:
   a main body made from a metal and having a columnar shape;
   a light emitting gas contained and sealed in the main body;
   an ellipsoidal reflecting surface formed in the main body such that the ellipsoidal reflecting surface has a first focal point at which the laser beam converges;
   a light exit window provided in front of the ellipsoidal reflecting surface, the light exit window being configured to transmit ultraviolet light;
   a light entrance window provided at a predetermined position of the main body such that the laser beam is incident to the light entrance window; and
   a convection controlling member,
   the main body, the light exit window, and the light entrance window forming in combination a closed space to contain the light emitting gas,
   the convection controlling member being provided in the closed space, the convection controlling member being located at a predetermined position such that the convection controlling member faces the plasma that will be generated in the vicinity of the first focal point of the ellipsoidal reflecting surface,
   the light entrance window being provided at the same position as the light exit window such that the light entrance window is combined to form a light entrance-and-exit window, the light entrance-and-exit window being configured to transmit the laser beam and ultraviolet light.

2. The laser driven lamp according to claim 1, wherein the main body has a base portion in which the ellipsoidal reflecting surface is formed, and a front portion jointed to a front end of the base portion, the light entrance-and-exit window is provided at the front end of the front portion, and the light entrance-and-exit window is smaller than an opening defined by the ellipsoidal reflecting surface at the front end of the base portion.

3. The laser driven lamp according to claim 1, wherein the front portion has a cylindrical inner surface therein such that the cylindrical inner surface has a decreasing diameter toward a front end of the front portion.

4. The laser driven lamp according to claim 1 further comprising at least one air release pipe at the front portion, the at least one air release pipe communicating with the closed space in the main body.

5. The laser driven lamp according to claim 1, wherein the base portion has a cylindrical part, and a reflecting part received in the cylindrical part,
   the reflecting part is made from a metallic material that is different from a material of the cylindrical part, and
   the elliptical reflecting surface is formed on the reflecting part.

6. A laser driven lamp configured to receive a converging laser beam and generate plasma from the laser beam, the laser driven lamp comprising:
   a main body made from a metal and having a columnar shape;
   a light emitting gas contained and sealed in the main body;
   an ellipsoidal reflecting surface formed in the main body such that the ellipsoidal reflecting surface has a first focal point at which the laser beam converges;
   a light exit window provided in front of the ellipsoidal reflecting surface, the light exit window being configured to transmit ultraviolet light; and
   a light entrance window provided at a predetermined position of the main body such that the laser beam is incident to the light entrance window,
   the main body, the light exit window and the light entrance window forming in combination a closed space to contain the light emitting gas,
   the light entrance window being provided at the same position as the light exit window such that the light entrance window is combined to form a light entrance-and-exit window, the light entrance-and-exit window being configured to transmit the laser beam and ultraviolet light,
   the main body having a base portion in which the ellipsoidal reflecting surface is formed, and a front portion jointed to a front end of the base portion, and
   the light entrance-and-exit window being provided at a front end of the front portion and being smaller than an opening defined by the ellipsoidal reflecting surface at the front end of the base portion.

7. The laser driven lamp according to claim 6, wherein the front portion has a cylindrical inner surface therein such that the cylindrical inner surface has a decreasing diameter toward a front end of the front portion.

8. The laser driven lamp according to claim 7 further comprising at least one air release pipe at the front portion, the at least one air release pipe communicating with the closed space in the main body.

9. The laser driven lamp according to claim 7, wherein the base portion has a cylindrical part, and a reflecting part received in the cylindrical part,
   the reflecting part is made from a metallic material that is different from a material of the cylindrical part, and
   the elliptical reflecting surface is formed on the reflecting part.

10. The laser driven lamp according to claim 6, wherein the main body is made from tungsten or a tungsten alloy.

11. A laser driven light source device comprising:
    the laser driven lamp according to claim 6; and
    a dichroic mirror disposed in front of the light entrance-and-exit window such that the converging laser beam enters the main body through the dichroic mirror, the dichroic mirror being configured to reflect the laser beam and transmit the ultraviolet light or to transmit the laser beam and reflect the ultraviolet light.

\* \* \* \* \*